United States Patent [19]

Terry

[11] Patent Number: 5,549,723
[45] Date of Patent: Aug. 27, 1996

[54] FILTER CAP

[76] Inventor: Daniel J. Terry, 133 164th St. SE., Mill Creek, Wash. 98012

[21] Appl. No.: 299,824

[22] Filed: Aug. 31, 1994

[51] Int. Cl.$^6$ .................................................. B01D 46/00
[52] U.S. Cl. .................................. 55/493; 55/502; 55/508
[58] Field of Search .................................. 55/341.1, 324, 55/334, 337, 378, 379, 502, 493, 508; 210/323.2, 493.2, 493.5

[56] References Cited

U.S. PATENT DOCUMENTS

| | | | |
|---|---|---|---|
| 1,968,016 | 7/1934 | Dabadie | 55/379 |
| 3,377,783 | 4/1968 | Young | 55/379 |
| 3,830,043 | 8/1974 | Nielsen et al. | 55/378 |
| 3,951,627 | 4/1976 | Barr, Jr. et al. | 55/379 |
| 4,089,664 | 5/1978 | Noland | 55/379 |
| 4,323,376 | 4/1982 | Rosenquest | 55/378 |
| 4,345,924 | 8/1982 | Margraf | 55/379 |
| 4,415,343 | 11/1983 | Margraf | 55/379 |
| 4,504,288 | 3/1985 | Kreft | 55/379 |
| 4,775,469 | 10/1988 | Zimmerly | 55/378 |
| 4,948,504 | 8/1990 | Kierdorf et al. | 55/378 |

FOREIGN PATENT DOCUMENTS

| | | | |
|---|---|---|---|
| 2823107 | 11/1979 | Germany | 55/379 |
| 3812790 | 10/1989 | Germany | 55/378 |
| 3934700 | 11/1990 | Germany | 55/379 |

OTHER PUBLICATIONS

Daniel J. Terry, Sketches of Prior Art System, Figs. 1–3.

Primary Examiner—C. Scott Bushey

[57] ABSTRACT

The invention disclosed here is a filter cap device for releasably mounting large filters to a barrier wall. The filter cap has an oversize radius overlapping a filter opening in the wall. A plurality of hand-operated outboard locking devices releasably connect the cap to the wall. Likewise, a plurality of hand-operated inboard locking devices releasably connect the cap to the filter. The cap has a central opening which defines an air passageway from the filter through the wall. When it is desired to replace a filter, the filter cap and filter can be removed from the opening as a single unit, followed by disconnecting the used filter from the filter cap. A replacement filter is then attached to the cap and the entire unit is reinstalled.

11 Claims, 6 Drawing Sheets

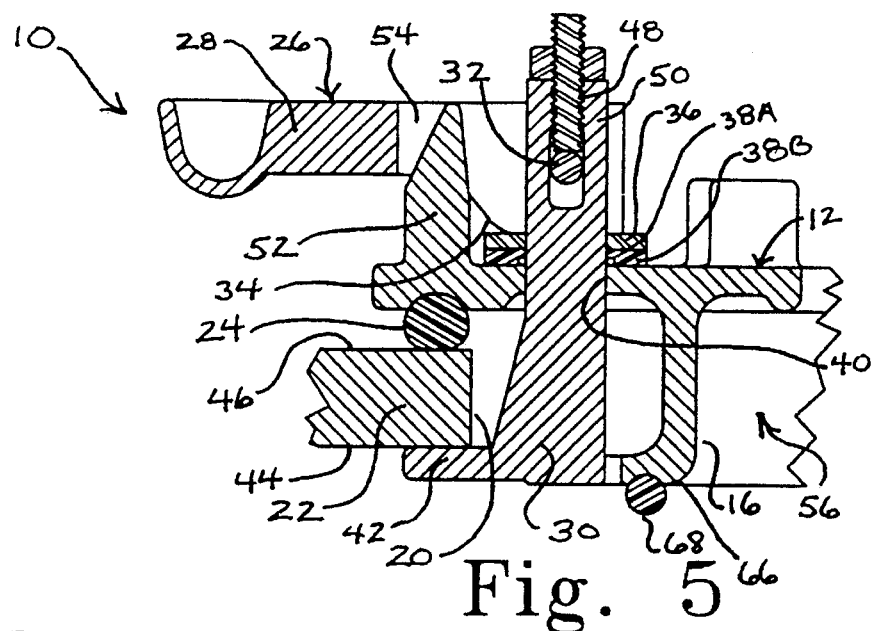
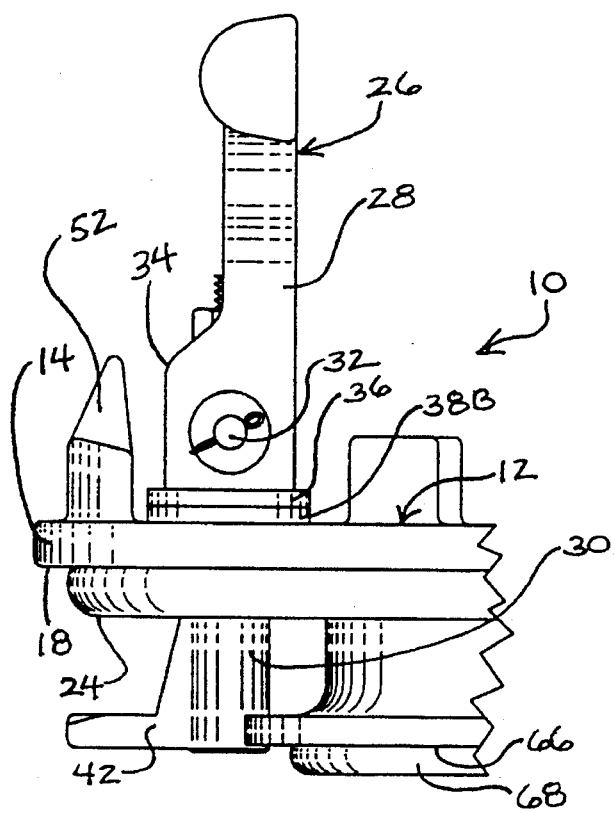

FILTER CAP

TECHNICAL FIELD

The invention disclosed here is a reusable, quick-release filter cap for mounting large filters to a barrier wall inside a cyclone vacuum lift device.

BACKGROUND INFORMATION

Many materials such as cement, pebble lime, and powders are carried as bulk cargo in ships and barges. Cargo of this type is generally off-loaded by large-size vacuum systems. The vacuum airflow generated by these systems is typically compressor-driven by a number of diesel-powered engines. As the material is off-loaded, it is pulled into a cyclone device where the airflow is separated from the entrained material. There, the material is moved onward by gravity flow or alternative means.

The airflow is separated from entrained material via large filters which are positioned across openings in a tube sheet or barrier wall within the cyclone device. Typically, the barrier wall is a horizontal or vertical plate. Oftentimes, two dozen or more circular filter openings, usually one foot in diameter or less, are distributed around and across the barrier wall.

Prior to the present invention, filters were individually mounted across barrier wall openings. They were installed by means of an annular mounting plate bolted into position on one side of the barrier wall. An end of a filter basket extended through the wall opening and was bolted directly to the mounting plate. The filter basket held a single filter against the mounting plate.

The space on the filter-side of the barrier wall is a dirty area where both the airstream and entrained material are received. The air is separated by pulling it through the filters by one or more large compressors. By necessity, the filtered air must subsequently pass directly through the compressors.

It is critical that the filters be sealed effectively. Otherwise, debris can be sucked through the barrier wall and into the compressors, thereby causing extensive damage that can literally destroy them. This is a significant problem because the cost of replacing a compressor can range from $40,000 to in excess of $100,000, depending on system size and design.

In this respect, one of the problems associated with the above design is that basket-held filters are not tightly clamped against the mounting plate by the filter basket. This impairs the effectiveness of the filter-to-plate seal. In recognition of this drawback, attempts have been made to pull the filter tightly against the mounting plate by means of threaded bolts having ends engaged directly with the filter, while, at the same time, the filter is held in place by the basket. This technique has met with questionable success.

Moreover, the above design, in combination with the large size of the filters (typically one foot in diameter by five feet in length), presents significant maintenance problems. Each filter eventually becomes fouled and must be replaced. This involves the erection of scaffolding on the dirty side of the barrier wall in order to support workmen while they remove and reinstall filter baskets. Workmen are also required on the opposite or clean side of the barrier wall to assist in bolting the basket into place. This process has been very expensive in terms of labor costs, because of the many days and large crew of workers required.

The present invention makes filter replacement quick and easy by a single workman operating solely from the clean side of the barrier wall. A single workman using the invention can replace a battery of filters in literally a few hours as opposed to the many days required by the prior design.

SUMMARY OF THE INVENTION

The invention is a filter "cap" that is releasably mountable to a barrier wall in a cyclone-type vacuum-lift machine. The filter cap has an outer peripheral edge that is shaped to overlap one side of the perimeter of an opening through the wall. The peripheral edge is connected to the barrier wall by a set of hand-operated, releasable locking devices. A central body portion of the cap projects through the opening and defines an air passageway through the wall. A filter is releasably connectable to the central portion on the other side of the wall by a separate set of releasable, hand-operated locking devices. The air passageway defines an airflow path leading from the filter, on one side, through the wall to the other side.

In most cases, the wall opening will be circular. In preferred form, the filter cap has a generally annular body whose outer peripheral edge is defined by a circular radius that is greater than the radius of the wall opening. At least one circular and reusable seal is positioned on the underside of the peripheral edge and rests in between the edge and barrier wall when the cap is mounted to the wall.

The cap carries a plurality of circumferentially arranged outboard locking devices. These devices cooperatively clamp the peripheral edge tightly against the barrier wall. Each locking device has a hand-operated pawl for engaging the peripheral edge of the cap with the wall opening.

The filter cap further carries a plurality of circumferentially arranged inboard locking devices. Each one has a hand-operated clamp rod member that extends through the air passageway. Each rod has an end arrangement designed to connect the filter to the central portion of the filter cap.

Each inboard locking device has a handle that is pivotably mounted to the filter cap. The clamp rod is pivotably mounted to the handle and is pulled or pushed through the air passageway, depending on the directional movement of the handle. A clamp follower is slidingly mounted on the clamp rod and can move at least partially along its length. The follower has a lip that is shaped to engage with an edge border region of the filter. When the clamp rod is pulled by movement of the handle, the follower lip likewise pulls the filter against the central portion of the filter cap. A spring interconnects the clamp rod and follower and is biased to allow the lip to maintain tension against the filter after the handle has been moved to the end of its range of movement.

The outboard locking devices cooperatively mount the filter cap to the barrier wall, and the inboard locking devices cooperatively connect the filter to the filter cap. When the filter must be replaced, the outboard locking devices are easily released by hand, thereby enabling the filter cap and filter to be lifted or removed out through the barrier wall opening as a single unit. Likewise, the inboard locking devices are easily released by hand to subsequently permit the easy removal of the old filter and attachment of a new one. Then, the new filter and cap can be reinstalled and locked in place. Essentially, this can be done by one man in a very short period of time.

BRIEF DESCRIPTION OF THE DRAWINGS

In the drawings, like reference numerals and letters refer to like parts throughout the various views, and wherein:

FIG. 5 is a side cross-sectional view of an outboard locking device which is mounted to the filter cap, and shows it in a locked condition;

FIG. 6 is a side view of the outboard locking device shown in FIG. 5, and shows it in an unlocked condition;

BEST MODE FOR CARRYING OUT THE INVENTION

Figure 1:
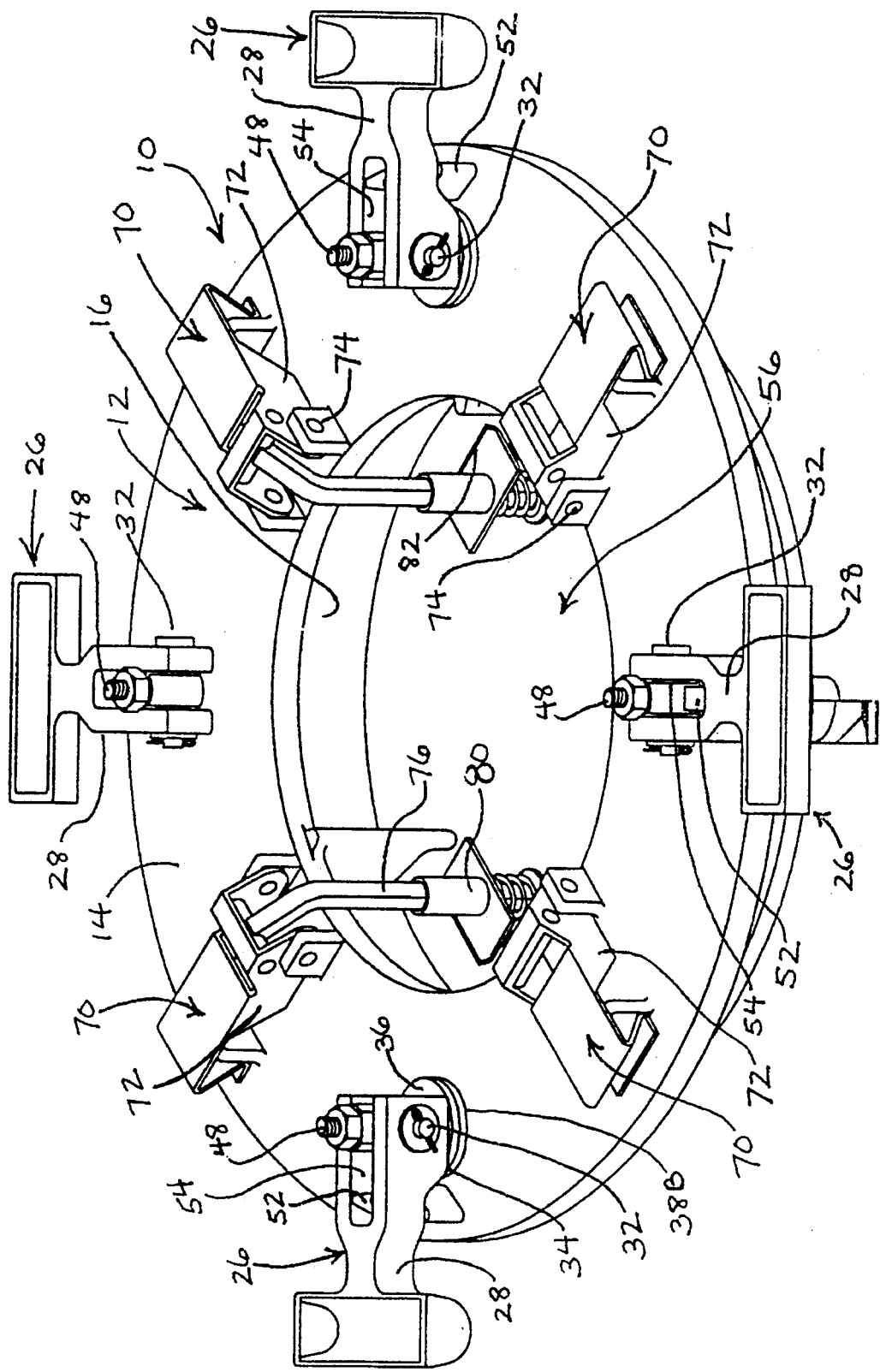
FIG. 1 is a pictorial view of a filter cap constructed in accordance with a preferred embodiment of the invention.
Figure 2:
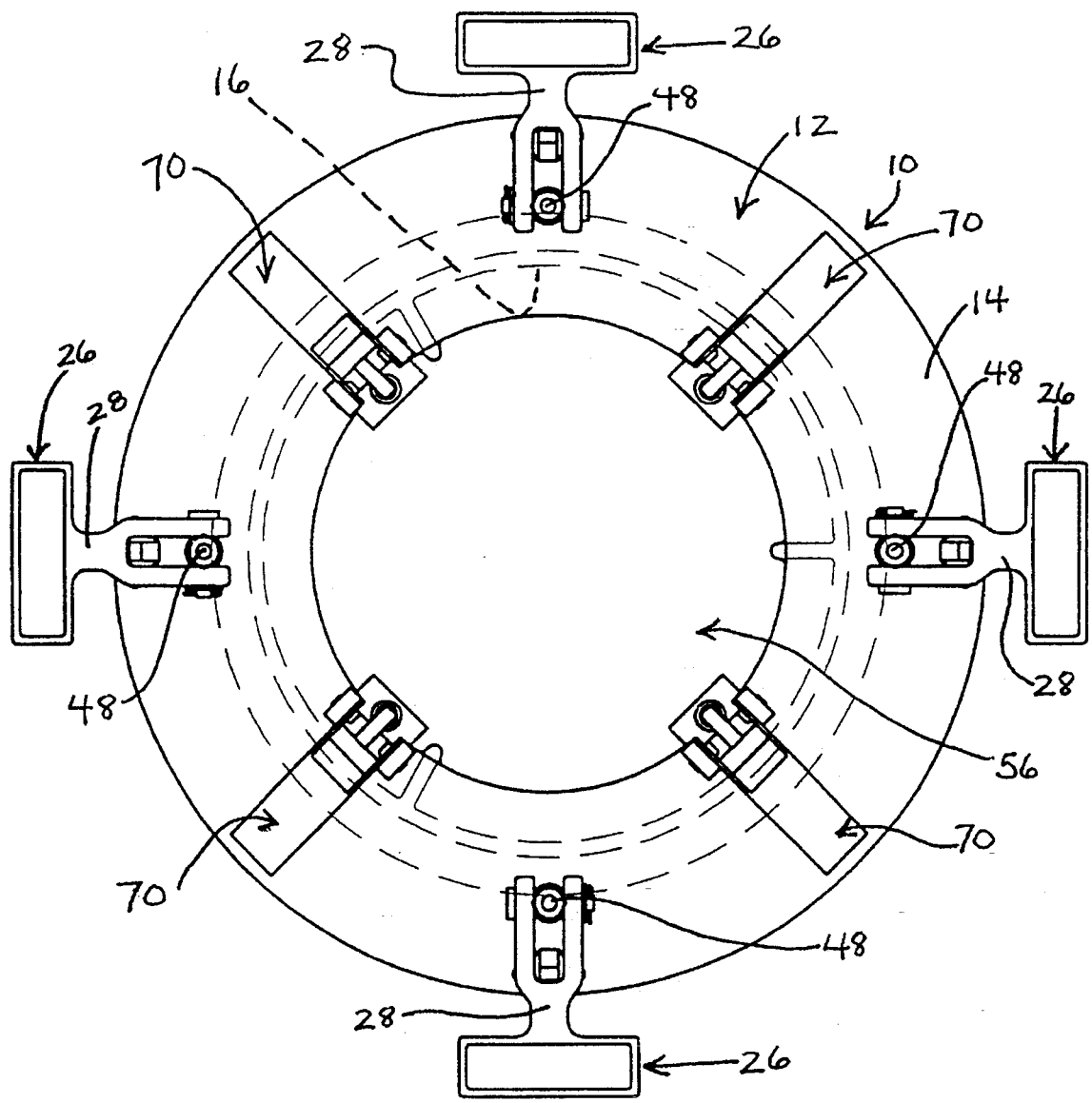
FIG. 2 is a top plan view of the filter cap.
Figure 3:
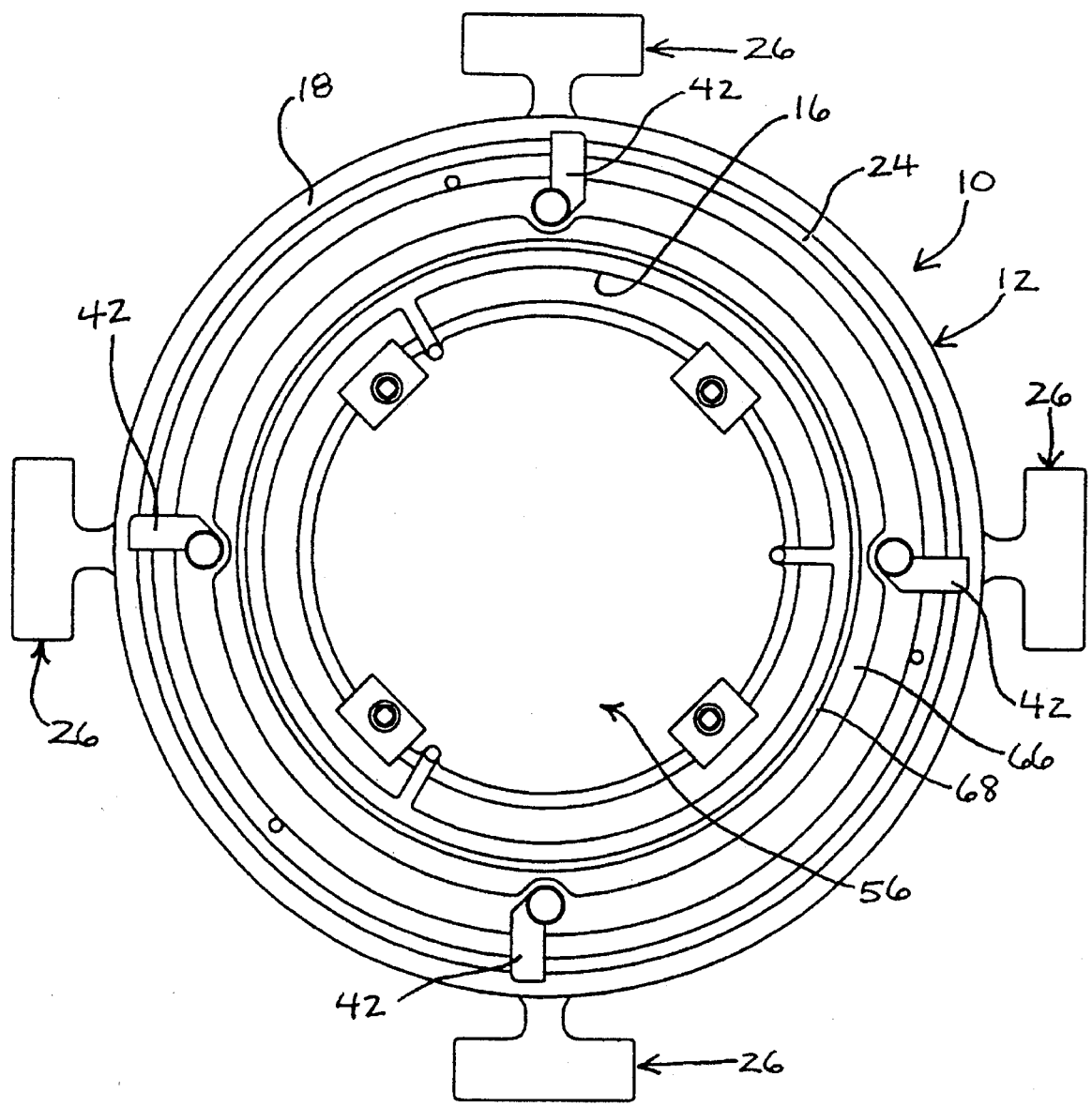
FIG. 3 is a bottom plan view of the filter cap.

Referring now to the drawings, and first to FIG. 1, shown generally at 10 is a filter cap constructed in accordance with a preferred embodiment of the invention.

The filter cap 10 has an annular shaped body 12. Part of the body is in the form of a circular plate portion 14. Another part is a generally cylindrical central portion 16 which depends downwardly from the plate 14.

Figure 4:
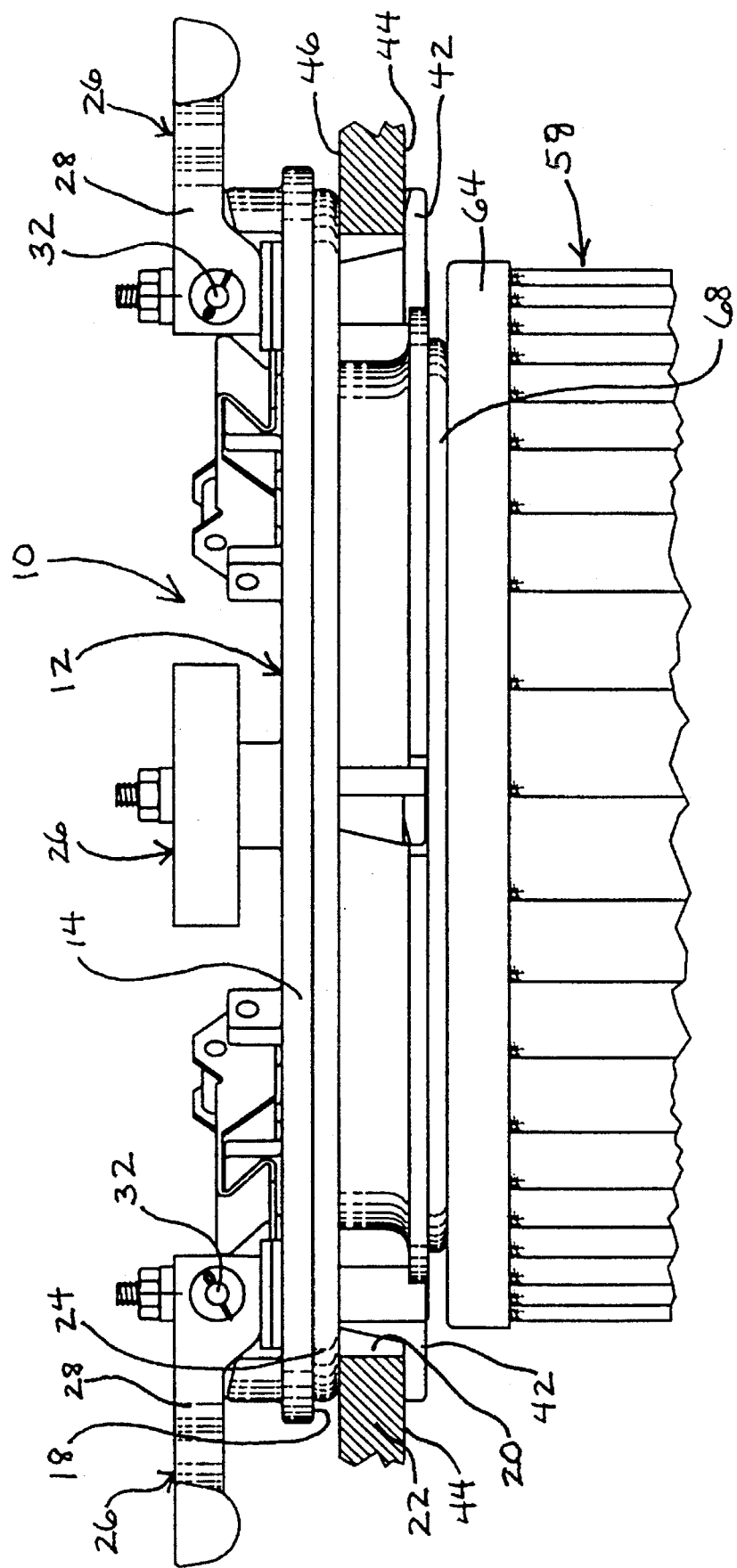
FIG. 4 is a side view of the filter cap, and shows an upper part of a filter connected to the filter cap.

Referring to FIG. 4, the plate portion 14 defines an outer peripheral edge 18 which overlaps the perimeter of an opening 20 through a barrier wall 22. A circular compression seal 24, mounted to the underside of the peripheral edge 18, prohibits airflow from passing between the wall and edge. Preferably, the compression seal 24 is made of EPDM rubber which enables it to be reused a number of times.

The filter cap 10 is mounted to the opening 20 by a plurality of hand-operated outboard locking devices 26. The construction of each outboard locking device is shown in detail in FIGS. 5 and 6, and attention is now directed there.

Each outboard locking device 26 has a compression handle 28 that is pivotably mounted to a locking pawl 30 by means of a pin 32. The handle 28 has a cam portion 34 (see FIG. 5) which slides against washer 36 as the handle is pivoted around pin 32. A pair of ⅛ inch EPR O-rings 38A, 38B underlie the washer 36 and provide an air seal around the pawl 30. The pawl 30 can slide vertically through a circular bore 40 (see FIG. 5) in plate 14. When the handle 28 is pulled downwardly to the position shown in FIG. 5, the cam portion 34 of the handle causes the pawl 30 to move upwardly. This, in turn, causes a latching edge 42 of the pawl 30 to engage with the filter side 44 of the barrier wall 22. When this happens, the compression seal 24 is squeezed between the plate and the opposite side 46 of the wall 22.

The pawl 30 is released from the wall by pulling or pivoting the handle 28 to the position shown in FIG. 6. This causes the pawl to move downwardly and releases latching edge 42 from wall surface 44.

When in a released condition, the handle 28 can be rotated about the vertical axis defined by the pawl 30. This, in turn, rotates the pawl latch 42 inside the circular area defined by the wall opening 20. This, of course, enables the lifting release of the filter cap 10 from the barrier wall 22.

The outboard locking device 26 has an adjustment screw 48 threaded into the upper end 50 of the pawl 30. The adjustment screw 48 may be turned to alter the position of pin 32 relative to pawl latching edge 42. This enables an adjustment in the amount of clamping force created when the handle is closed to the position shown in FIG. 5.

The filter cap plate 14 has a handle-locking projection 52 which extends upwardly at the location of each outboard locking device (see FIGS. 5 and 6). The projection extends through a fork 54 in the handle 28 when it is in the locking position. This prevents rotation of the pawl 32 and insures that the filter cap will remain locked in place when in use.

In preferred form, the filter cap 10 has four outboard locking devices 26 distributed or arranged around the outer periphery of plate 14. The outboard locking devices 26 cooperatively hold the filter cap 10 firmly in place over opening 20, thus ensuring that there will be no air leakage between the filter cap and the barrier wall opening 20.

Referring again to FIG. 1, the central portion 16 of the filter cap 10 defines a circular or cylindrical air passageway, indicated generally at 56. The air passageway 56 leads from inside a filter 58 to the opposite side of the barrier wall 22.

Figure 7:
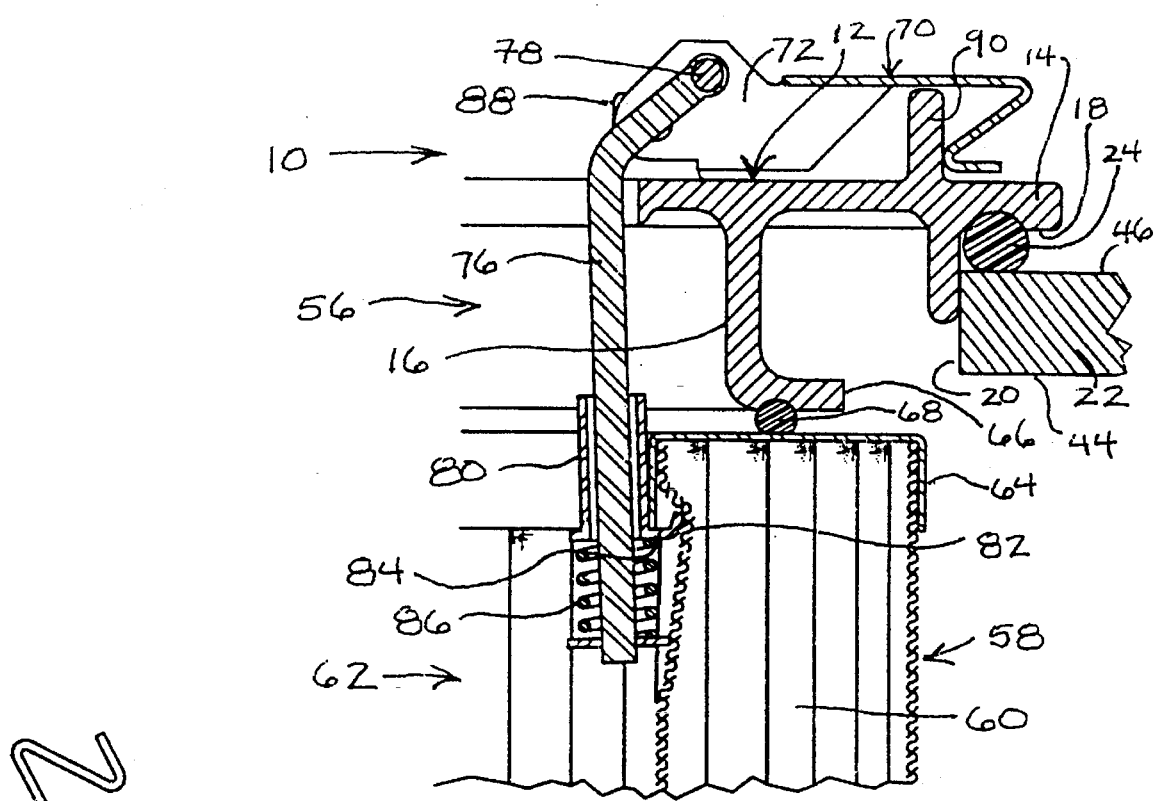
FIG. 7 is a cross-sectional view of an inboard locking device, showing it in a locked condition, and illustrates how the filter is connected to the filter cap.

Referring to FIG. 7, the filter 58 is in the form of a hollow cylinder having a wall 60 made of a filtering material. The hollow space inside the filter is indicated generally at 62. The filter 58 is closed other than its upper end, which rests, or is pulled upwardly (as will be described below) against the central portion 16 of the filter cap.

The filter 58 has an edge border region 64 which abuts against a flanged lower edge 66 of central portion 16. At least one circular seal 68 is positioned between flanged edge 66 and filter border region 64 to ensure a good air seal between the filter cap 10 and filter 58. The seal 68 is preferably made from the same material as seal 24.

The filter 58 is releasably connected to the filter cap 10 by a plurality of inboard locking devices 70. These devices are mounted to the top of filter plate 14 and are circumferentially distributed around the air passageway 56. In preferred form, the filter cap 10 has four inboard locking devices 70 which cooperatively hold the filter 58 against the filter cap in the manner described below.

Figure 8:
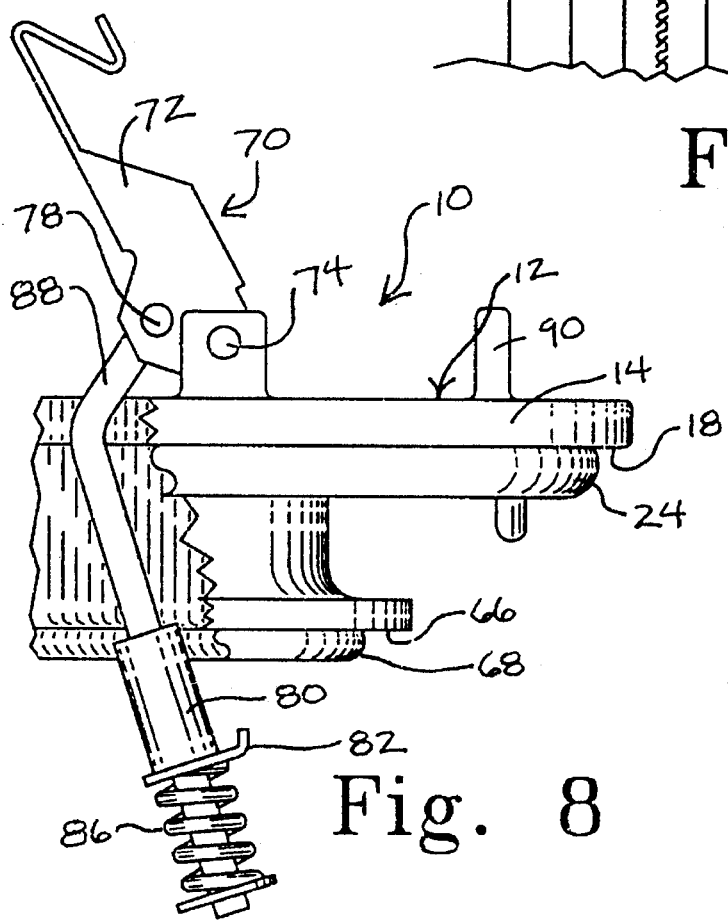
FIG. 8 is a side view of the locking device shown in FIG. 7, but shows it in an unlocked condition.

Referring now to FIG. 8, each inboard locking device 70 has a handle 72 which is pivotably connected at 74 to the filter cap plate 14. An elongated clamp rod 76 is pivotably connected at 78 to the handle 72. Connecting point 78 is radially offset from connecting point 74.

A cylindrical clamp follower 80 is slidably connected over the clamp rod 76. The follower 80 has a lip 82 which is shaped to engage with a inner edge 84 of the filter edge border region 64 (see FIG. 7) as inboard locking device 70 is locked. A spring 86 interconnects the rod 76 and follower 80 and is biased to push the follower upwardly along the rod toward the locking device handle 72.

The inboard locking device 70 captures the filter 58 by first moving handle 72 to the position shown in FIG. 8. At that position, the inboard locking device 70 is in a fully released condition. The filter 58 is then moved into the position shown in FIGS. 4 and 7. At that point, the clamping rod 76, which extends through passageway 56, is manipulated so that the cam follower lip 82 catches filter edge 84. Then, the handle 72 is pivoted to the position shown in FIG. 7. This pulls the cam rod upwardly and tightly engages the cam follower 80 with the filter 58. The spring 86 defines a suitable amount of clamping force so that the filter will not be damaged, yet holds the filter tightly against the filter cap.

An upper portion 88 of the clamp rod is bent to enable the handle 72 to have an over-center clamping action when it is moved to the position shown in FIG. 7. This enhances the clamping force applied to the filter. When the inboard lock 70 is closed, the handle 72 rests against an upward projection 90 on the filter cap plate 14.

All of the outboard and inboard locking devices 27, 70 are hand-operated, which makes the filter cap 10 very easy to remove and install in connection with filter replacement.

It is to be appreciated that the above description sets forth what is believed to be the best mode for carrying out the invention. Nevertheless, it is conceivable that subsequent modifications or improvements may be made to the above-described design. Consequently, what is considered to be the spirit and scope of the invention is not to be limited by the above description. Instead, the invention is to be limited solely by the patent claim or claims which follow, the interpretation of which is to be made in accordance with the established doctrines of patent claim interpretation.

What is claimed is:

1. A device for releasably mounting a filter across an opening through a barrier wall, comprising:

a filter cap that is releasably mountable by hand to the barrier wall, the filter cap having a peripheral edge portion that is shaped to overlap the perimeter of the opening on an upper side of the barrier wall, and a body portion that projects downwardly through the opening, and a centrally-arranged air passageway through the body portion for communicating an airflow between a region above the barrier wall and another region below the barrier wall, and wherein, in use, the filter is positioned substantially in the region below the barrier wall, and including a plurality of hand-operated inboard locking devices mounted to the filter cap, each inboard locking device having a member that extends through the centrally-arranged air passageway and is adapted to releasably mount the filter directly to the body portion.

2. The device of claim 1, wherein each inboard locking device includes inboard locking means for causing the member to clamp the filter directly against the filter cap body portion.

3. The device of claim 2, including at least one peripheral compression seal mounted to the body portion of the filter cap for creating an air seal between the filter and body portion.

4. The device of claim 1, wherein at least one of the inboard locking devices comprises a handle portion pivotably mounted to the filter cap, and an elongated clamp rod pivotably connected to the handle portion, and a clamp follower slidingly mounted on the clamp rod, and a spring interconnecting the clamp rod and clamp follower and biased to slidingly move the clamp follower toward the handle portion, wherein the pivotable connection between the clamp rod and handle portion is radially offset from the pivotable connection between the handle portion and filter cap, in a manner so that pivoting the handle causes the clamp rod to be pulled or pushed through the air passageway depending on the direction of pivotal movement of the handle portion, and further, the clamp follower has a lip shaped to engage an edge border region of the filter as the handle portion is moved to pull the clamp rod.

5. The device of claim 4, including at least one peripheral compression seal mounted to the body portion of the filter cap for creating an air seal between the filter and body portion.

6. The device of claim 4, wherein the spring interconnects a lower end of the clamp rod and the clamp follower.

7. A filter cap for releasably mounting a filter across a generally circular opening through a barrier wall, comprising:

an annular body with an outer peripheral edge portion that is shaped to overlap the perimeter of the circular opening on one side of the barrier wall, and a central portion that projects through the opening at least to the other side of the barrier wall, and a circular air passageway through the central portion;

a plurality of hand-operated outboard locking devices connected to the annular body, the locking devices being arranged around and adjacent the peripheral edge portion of the annular body, each outboard locking device having means for releasably clamping the peripheral edge portion against the barrier wall; and a plurality of hand-operated inboard locking devices connected to the annular body, each inboard locking device having a member that extends through the air passageway and is adapted to releasably engage the filter, and further, each inboard locking device having inboard locking means for causing the member to releasably clamp the filter against the central portion of the annular body.

8. The device of claim 7, wherein at least one of the inboard locking devices comprises a handle portion pivotably mounted to the annular body, and an elongated clamp rod pivotably connected to the handle portion, and a clamp follower slidingly mounted on the clamp rod, and a spring interconnecting the clamp rod and clamp follower and biased to slidingly move the clamp follower toward the handle portion, wherein the pivotable connection between the clamp rod and handle portion is radially offset from the pivotable connection between the handle portion and annular body, in a manner so that pivoting the handle causes the clamp rod to be pulled or pushed through the air passageway depending on the direction of pivotal movement of the handle portion, and further, the clamp follower has a lip shaped to engage an edge border region of the filter as the handle portion is moved to pull the clamp rod.

9. The device of claim 8, wherein the spring interconnects a lower end of the clamp rod and the clamp follower.

10. The device of claim 7, including at least one peripheral compression seal mounted to the body portion of the filter cap for creating an air seal between the filter and body portion.

11. A device for releasably mounting a filter across an opening through a barrier wall, comprising:

a filter cap that is releasably mountable by hand to the barrier wall, the filter cap having a peripheral edge portion that is shaped to overlap the perimeter of the opening on an upper side of the barrier wall, and a body portion that projects downwardly through the opening, and a centrally-arranged air passageway through the body portion for communicating an airflow between a region above the barrier wall and another region below the barrier wall, and wherein, in use, the filter is positioned substantially in the region below the barrier wall, and including a plurality of hand-operated inboard locking devices mounted to the filter cap, for releasably mounting the filter directly to the body portion, and still further including a plurality of hand-operated outboard locking devices mounted to the filter cap, each outboard locking device having means for releasably clamping directly onto the perimeter of the opening, for releasably securing the peripheral edge portion of the filter cap against the barrier wall.

* * * * *